(12) United States Patent
Mori (10) Patent No.: US 10,429,631 B2
(45) Date of Patent: Oct. 1, 2019

(54) IMAGE-AQUISITION SYSTEM

(71) Applicant: OLYMPUS CORPORATION, Hachioji-shi, Tokyo (JP)

(72) Inventor: Keigo Mori, Kanagawa (JP)

(73) Assignee: OLYMPUS CORPORATION, Tokyo (JP)

( * ) Notice: Subject to any disclaimer, the term of this patent is extended or adjusted under 35 U.S.C. 154(b) by 224 days.

(21) Appl. No.: 15/431,268

(22) Filed: Feb. 13, 2017

(65) Prior Publication Data
US 2017/0276925 A1    Sep. 28, 2017

(30) Foreign Application Priority Data

Mar. 25, 2016    (JP) .................................. 2016-061121

(51) Int. Cl.
*G02B 21/36*    (2006.01)
*G02B 21/06*    (2006.01)
(Continued)

(52) U.S. Cl.
CPC ........... *G02B 21/367* (2013.01); *G02B 21/06* (2013.01); *G02B 21/248* (2013.01); *G02B 21/26* (2013.01);
(Continued)

(58) Field of Classification Search
CPC .................................................. G02B 21/367
See application file for complete search history.

(56) References Cited

U.S. PATENT DOCUMENTS 6,272,235 B1    8/2001  Bacus et al.
6,522,774 B1    2/2003  Bacus et al.
(Continued)

FOREIGN PATENT DOCUMENTS

JP    2001519944 A    10/2001
WO       9839728 A1     9/1998
(Continued)

OTHER PUBLICATIONS

Extended European Search Report (EESR) dated Aug. 2, 2017 issued in counterpart European Application No. 17157350.4.
(Continued)

*Primary Examiner* — James M Pontius
(74) *Attorney, Agent, or Firm* — Holtz, Holtz & Volek PC (57) ABSTRACT

An image-acquisition system includes a microscope apparatus that acquires an image of a specimen; a map-image-acquisition portion that controls the microscope apparatus so as to acquire, at a low magnification, a map image including a plurality of anatomical regions in the specimen; an interface portion that allows a user to specify a desired anatomical region as a target region by means of unique IDs assigned to the individual anatomical regions; a processing portion that calculates a spatial position of the target region on the basis of the map image and atlas data having positional information of the individual anatomical regions; and a high-resolution image-acquisition portion that controls, on the basis of the spatial position of the target region, the microscope apparatus so as to acquire a high-resolution image of the target region in the specimen at a magnification that is greater than that of the map image.

12 Claims, 10 Drawing Sheets

(51) Int. Cl.
*G02B 21/24* (2006.01)
*G02B 21/26* (2006.01)
*G06T 7/32* (2017.01)

(52) U.S. Cl.
CPC ...... *G06T 7/32* (2017.01); *G06T 2207/30016* (2013.01); *G06T 2207/30024* (2013.01)

(56) References Cited

U.S. PATENT DOCUMENTS

| | | | |
|---|---|---|---|
| 6,775,402 | B2 | 8/2004 | Bacus et al. |
| 7,146,372 | B2 | 12/2006 | Bacus et al. |
| 7,463,761 | B2 * | 12/2008 | Eichhorn ............. G02B 21/367 382/133 |
| 10,139,613 | B2 * | 11/2018 | Hing .................... G02B 21/361 |
| 2003/0228042 | A1 | 12/2003 | Sinha |
| 2005/0254696 | A1 | 11/2005 | Bacus et al. |
| 2010/0119119 | A1 * | 5/2010 | Rittscher ............ G01N 33/5088 382/110 |
| 2014/0029812 | A1 | 1/2014 | Andras et al. |
| 2015/0317785 | A1 | 11/2015 | Andras et al. |
| 2016/0062101 | A1 | 3/2016 | Weiss et al. |

FOREIGN PATENT DOCUMENTS

| | | |
|---|---|---|
| WO | 9844446 A1 | 10/1998 |
| WO | 2014165989 A1 | 10/2014 |

OTHER PUBLICATIONS

Mikula, et al., "Internet-enabled high-resolution brain mapping and virtual microscopy", Neuroimage, Feb. 14, 2007, vol. 35, No. 1, pp. 9-15, Feb. 14, 2007.
European Office Action dated Jul. 24, 2018 issued in counterpart European Application No. 17157350.4.
Anonymous, "TestData.wiki. Vaa3D/Vaa3D_Wiki Wiki . GitHub, XP055492731", https://github.com/Vaa3D/Vaa3D_Wiki/wiki/TestData. wiki/af2c25fb6af8ceacf2f643f276695b13503cb36f, Feb. 2, 2016.
Long, et al., "Visualization and Analysis of 3D Microscopic Images", PLOS Computational Biology, Jun. 14, 2012, vol. 8, No. 6, p. e1002519.
European Office Action dated May 21, 2019 issued in counterpart European Application No. 17157350.4.
Pinkard, et al., "Micro-Magellan: A flexible, open source acquisition software for high throughput biological light microscopy", bioRxiv, XP055391349, DOI: 10.1101/038117, Retrieved from the Internet: URL: http://www.biorxiv.org/content/early/2016/01/28/038117, Jan. 28, 2016.

* cited by examiner

ATLAS

OVERALL SPECIMEN IMAGE

IMAGE-AQUISITION SYSTEM

CROSS-REFERENCE TO RELATED APPLICATIONS

This application claims the benefit of Japanese Patent Application No. 2016-061121, the contents of which is incorporated herein by reference.

TECHNICAL FIELD

The present invention relates to an image-acquisition system.

BACKGROUND ART

In the related art, there is a known image-acquisition system with which a target region is set on a low-resolution overall specimen image, for example, a map image, and then, a high-resolution image of the target region is acquired (for example, see Patent Literature 1).

In the case in which a portion of a region of a specimen needs to be observed in a greater detail, there is a problem in that acquiring a high-resolution overall specimen image increases the amount of time required to acquire the image, and the volume of image data is also increased. With the image-acquisition system described in Patent Literature 1, the overall specimen image is acquired at a low resolution, and the image of the target region is acquired at a high resolution, thus decreasing the amount of time required to acquire an image and decreasing the volume of the image data.

CITATION LIST

Patent Literature

{Patent Literature 1} Japanese Translation of PCT International Application, Publication No. 2001-519944

SUMMARY OF INVENTION

Solution to Problem

An aspect of the present invention is an image-acquisition system including: an image-acquisition portion that acquires an image of a specimen; a first image-acquisition control portion that controls the image-acquisition portion so as to acquire, at a first image-capturing magnification, a first image that includes a plurality of study regions in the specimen; a target-region specifying portion that allows a user to specify a desired study region as a target region by means of unique identification information assigned to the individual study regions; a position-calculating portion that calculates a spatial position of the target region specified by the target-region specifying portion on the basis of the first image acquired by the image-acquisition portion and a reference image having positional information of the individual study regions; and a second image-acquisition control portion that controls, on the basis of the spatial position of the target region calculated by the position-calculating portion, the image-acquisition portion so as to acquire a second image of the target region in the specimen at a second image-capturing magnification which is a magnification that is greater than the first image-capturing magnification.

DESCRIPTION OF EMBODIMENT

An image-acquisition system according to an embodiment of the present invention will be described below with reference to the drawings.

Figure 1:
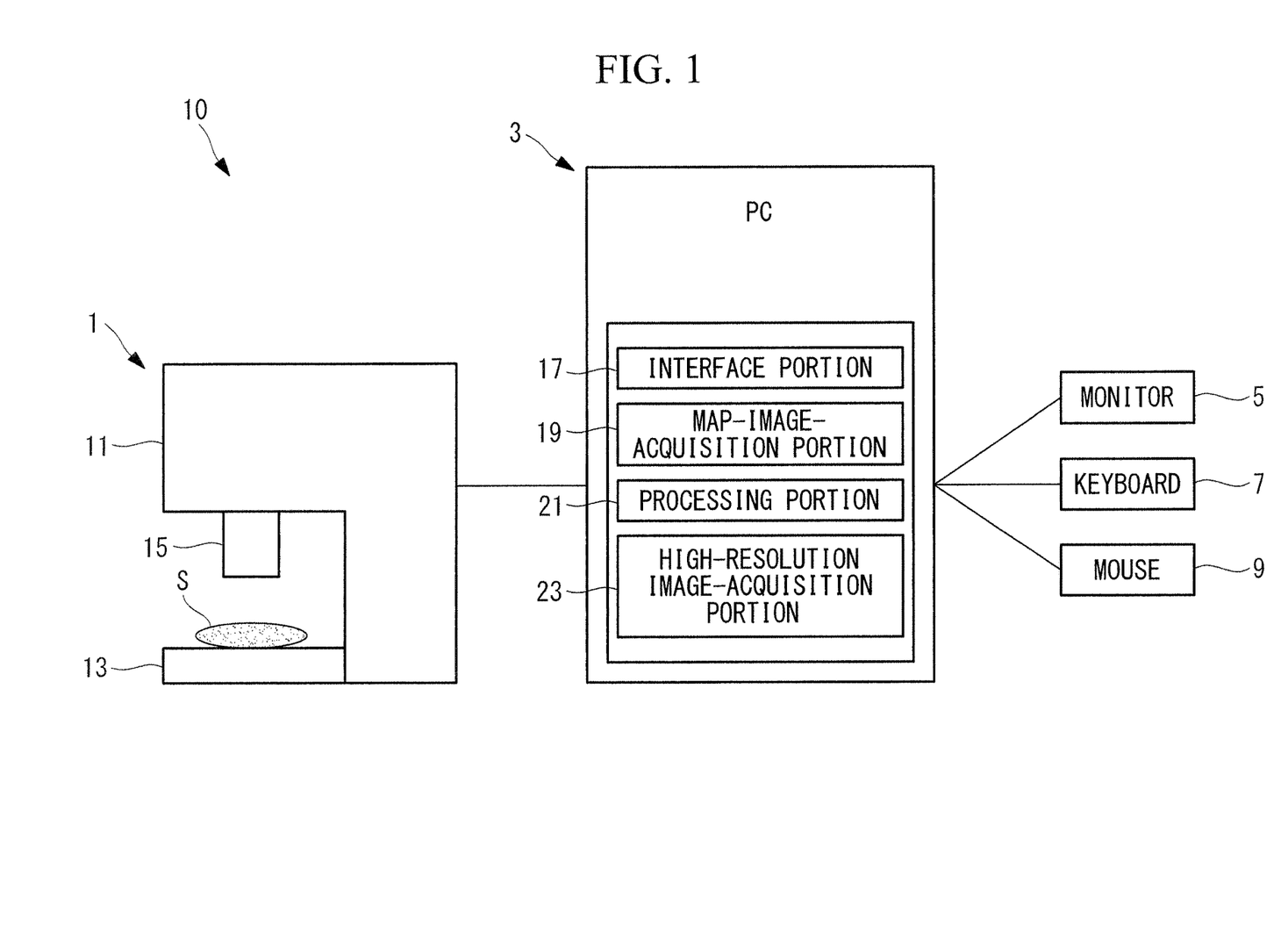
FIG. 1 is a configuration diagram showing, in outline, an image-acquisition system according to an embodiment of the present invention.

As shown in FIG. 1, an image-acquisition system 10 according to this embodiment is provided with: a microscope apparatus (image-acquisition portion) 1 that acquires an image of a specimen S; a PC (Personal Computer) 3 that controls the microscope apparatus 1; and a monitor 5, a keyboard 7, and a mouse 9 that are connected to the PC 3.

The microscope apparatus 1 is provided with: a microscope main body 11 equipped with a light source, a photodetector, a revolver, and so forth, which are not illustrated; a stage 13 on which the specimen S is placed; and a plurality of objective lenses 15 that have magnifications that are different from each other. In this embodiment, the brain, which has a plurality of anatomical regions (study regions), such as the visual cortical area, the hippocampus, and so forth will be described as an example of the specimen S.

The stage 13 is configured so as to be movable in the optical-axis direction (Z-direction) of the objective lens 15 and in directions (X-direction and Y-direction) that intersect the optical-axis direction of the objective lens 15.

The plurality of objective lenses 15 are mounted on the revolver and are switched among by means of the revolver, and thus, one of them is selectively placed in the optical path of a laser beam.

This microscope apparatus 1 is configured so as to radiate a laser beam emitted from the light source onto the specimen S via the objective lens 15, and so that, by collecting return light coming from the specimen S via the objective lens 15 and by detecting the return light by using the photodetector, it is possible to acquire an image in accordance with the luminance of the return light.

The PC 3 is provided with: an interface portion (target-region specifying portion) 17 that allows a user to specify a desired anatomical region in the specimen S as a target region; a map-image-acquisition portion (first image-acquisition control portion) 19 that controls the microscope apparatus 1 so as to acquire, at a low magnification (first image-capturing magnification), a map image (first image) that includes a plurality of anatomical regions in the specimen S; a processing portion (position-calculating portion) 21 that calculates the spatial position of the target region specified by the interface portion 17; and a high-resolution image-acquisition portion (second image-acquisition control portion) 23 that controls the microscope apparatus 1 so as to acquire, at a magnification (second image-capturing magnification) that is greater than that of the map image, a high-resolution image (second image) of the target region in the specimen S.

The interface portion 17, the map-image-acquisition portion 19, the processing portion 21, and the high-resolution image-acquisition portion 23 are individually realized by means of software.

Figure 2:
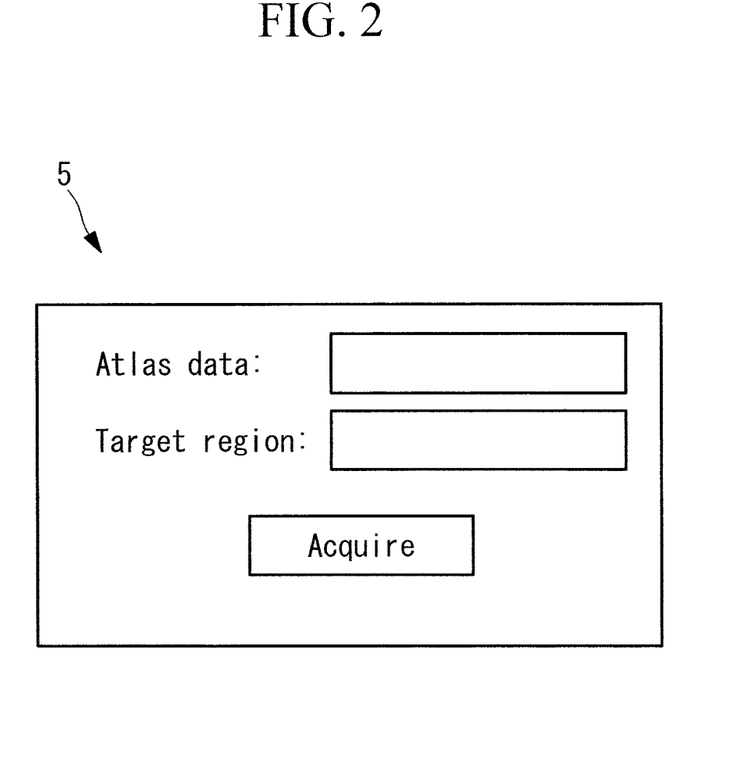
FIG. 2 is a diagram showing examples of input fields and an instruction button displayed on a monitor in FIG. 1 by an interface portion.

As shown in FIG. 2, the interface portion 17 is configured so as to receive instructions from the user, which are input via input fields "Atlas data" and "Target region" and an image-capture starting button "Acquire" displayed on the monitor 5 by using the mouse 9 and the keyboard 7.

Figure 3:
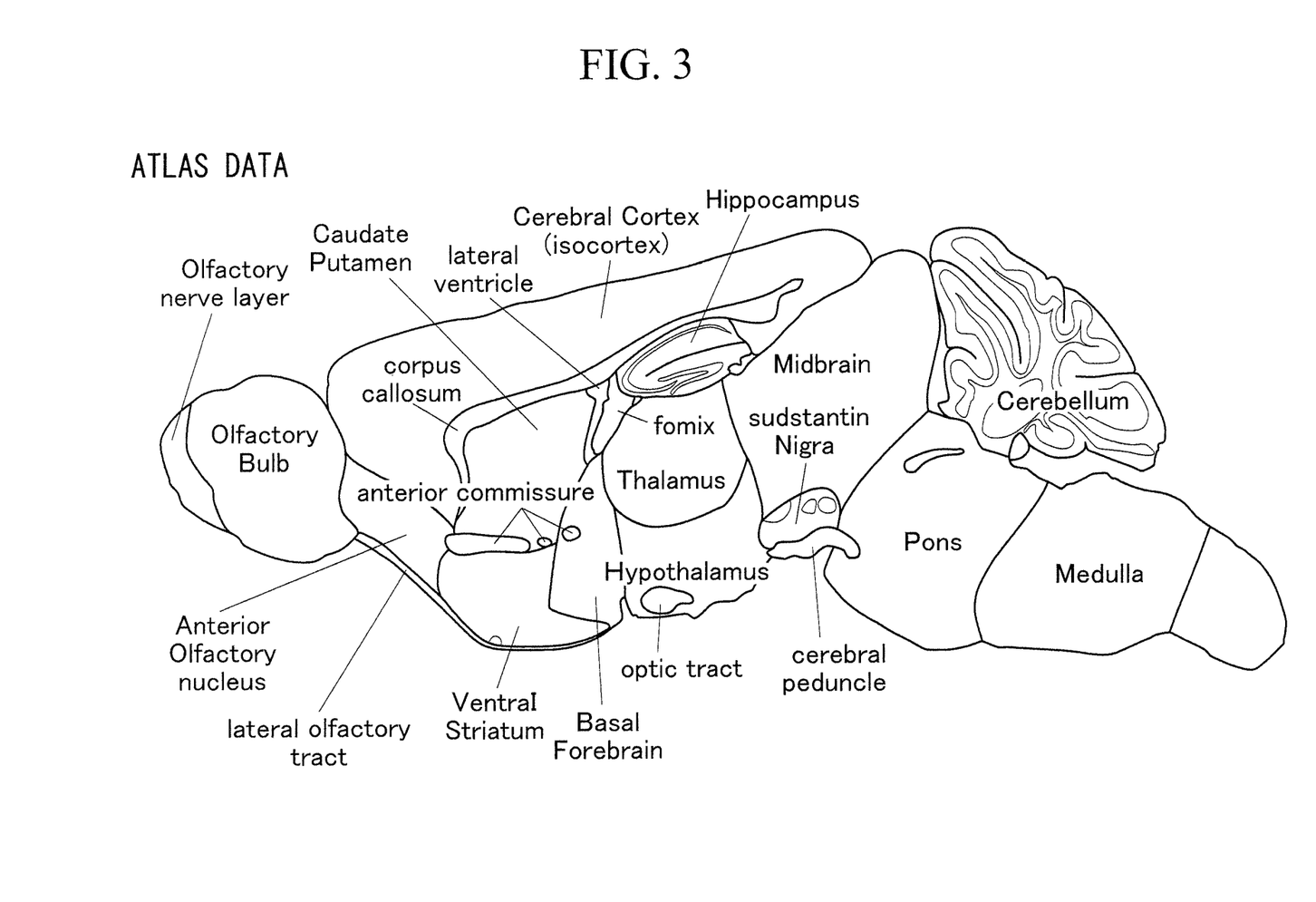
FIG. 3 is a diagram showing an example of brain atlas data.

This interface portion 17 is configured so as to allow the user to specify, for example, atlas data (reference image) that has positional information of the individual anatomical regions in the specimen S. Examples of the atlas data include two-dimensional image data having names and positional information of individual anatomical regions, such as those shown in FIG. 3. The user may specify atlas data that are publically available or atlas data that the user himself/herself has constructed.

In addition, the interface portion 17 is configured so as to allow the user to input or select a unique ID (IDENTIFICATION, identification information) for each of the anatomical regions in the specimen S, thus specifying a desired anatomical region as the target region. Regarding the ID, for example, in the case of the hippocampus, a name such as "Hippocampus" or an abbreviation such as "HC" may be used. In addition, the interface portion 17 is configured so as to input an image-capturing instruction to the map-image-acquisition portion 19 when the user gives an instruction to capture an image.

The map-image-acquisition portion 19 is configured so as to dispose the low-magnification objective lens 15, which is set in advance, in the optical path of the laser beam by rotating the revolver with respect to the microscope main body 11. In addition, the map-image-acquisition portion 19 is configured so as to move, stepwise at a predetermined pitch on the basis of the image-capturing instruction from the interface portion 17, the stage 13 in the Z-direction with respect to the microscope main body 11, thus capturing a Z-stack image (map image) of the specimen S. The objective lens 15 to be selected by the map-image-acquisition portion 19 may be set by the user in advance.

In addition, the map-image-acquisition portion 19 is configured so as to acquire, in the case in which the specimen S is too large to fit in a single viewing field, images of a plurality of areas in XY-directions by moving the stage 13 in the X-direction and the Y-direction with respect to the microscope main body 11 at each of the Z-positions, and so as to combine the images for the same Z-position into a single stack image (map image).

The processing portion 21 is configured so as to calculate, by means of registration processing, conversion parameters for positioning the atlas data specified by the interface portion 17 with respect to the map image of the specimen S acquired by using the microscope apparatus 1.

Figure 4A:
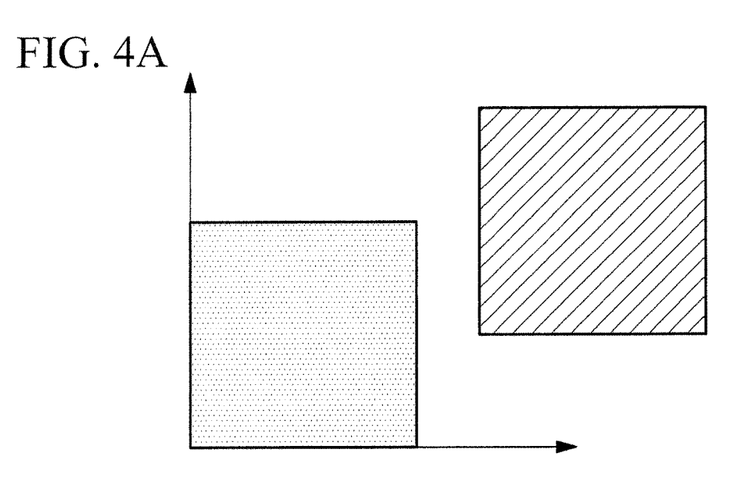
FIG. 4A is a diagram for explaining movement of atlas data.
Figure 4B:
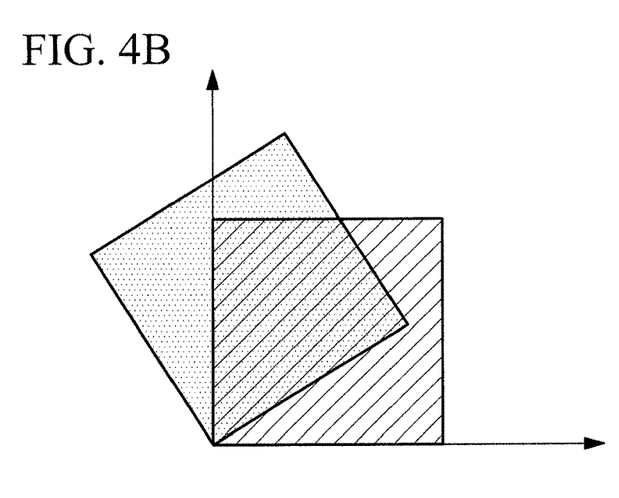
FIG. 4B is a diagram for explaining rotation of the atlas data.
Figure 4C:
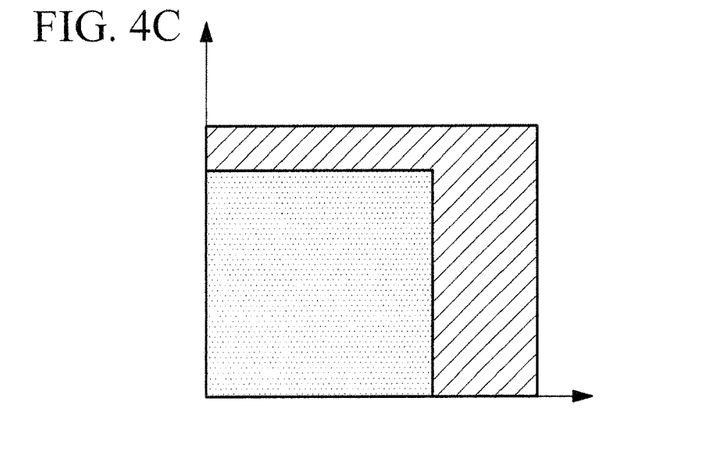
FIG. 4C is a diagram for explaining reduction and enlargement of the atlas data.
Figure 4D:
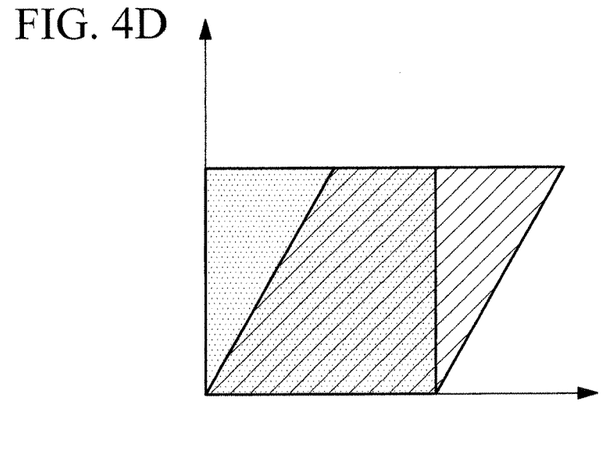
FIG. 4D is a diagram for explaining shearing of the atlas data.
Figure 5:
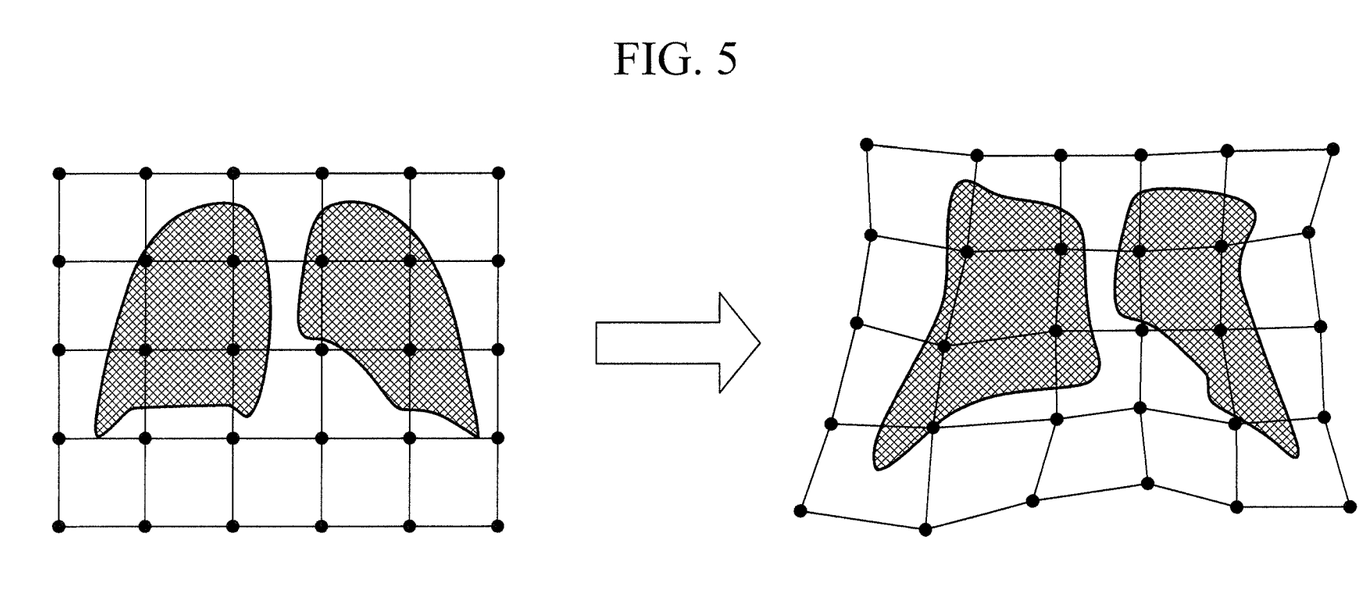
FIG. 5 is a diagram for explaining non-linear complex conversion of the atlas data.

Examples of the conversion parameters include: rigid-transformation parameters for moving the atlas data as shown in FIG. 4A and for rotating the atlas data as shown in FIG. 4B; affine-transformation parameters for reducing or enlarging the atlas data as shown in FIG. 4C and for shearing the atlas data as shown in FIG. 4D; and non-linear transformation parameters for converting the atlas data in a non-linear, complex manner as shown in FIG. 5.

Specifically, the processing portion 21 is configured so as to convert the atlas data by using any one of the above-described types of conversion parameters, so as to compare the converted atlas data with the map image, and so as to calculate the similarity between the converted atlas data and the map image by means of, for example, normalized cross-correlation.

Also, the processing portion 21 is configured so as to change the type of conversion parameters; so as to, for each type of conversion parameter, convert the atlas data and to calculate the similarities between the converted atlas data and the map image; and so as to calculate, for example, by means of the steepest descent method, the type of conversion parameter with which a maximum similarity is achieved. Note that, when performing the registration processing, it is preferable that the atlas data be converted to, for example, gray-scale 1-ch data (data in which the target organ, for example, the brain, and organs other than the brain are distinguished from each other) or 1-bit data.

Figure 6:
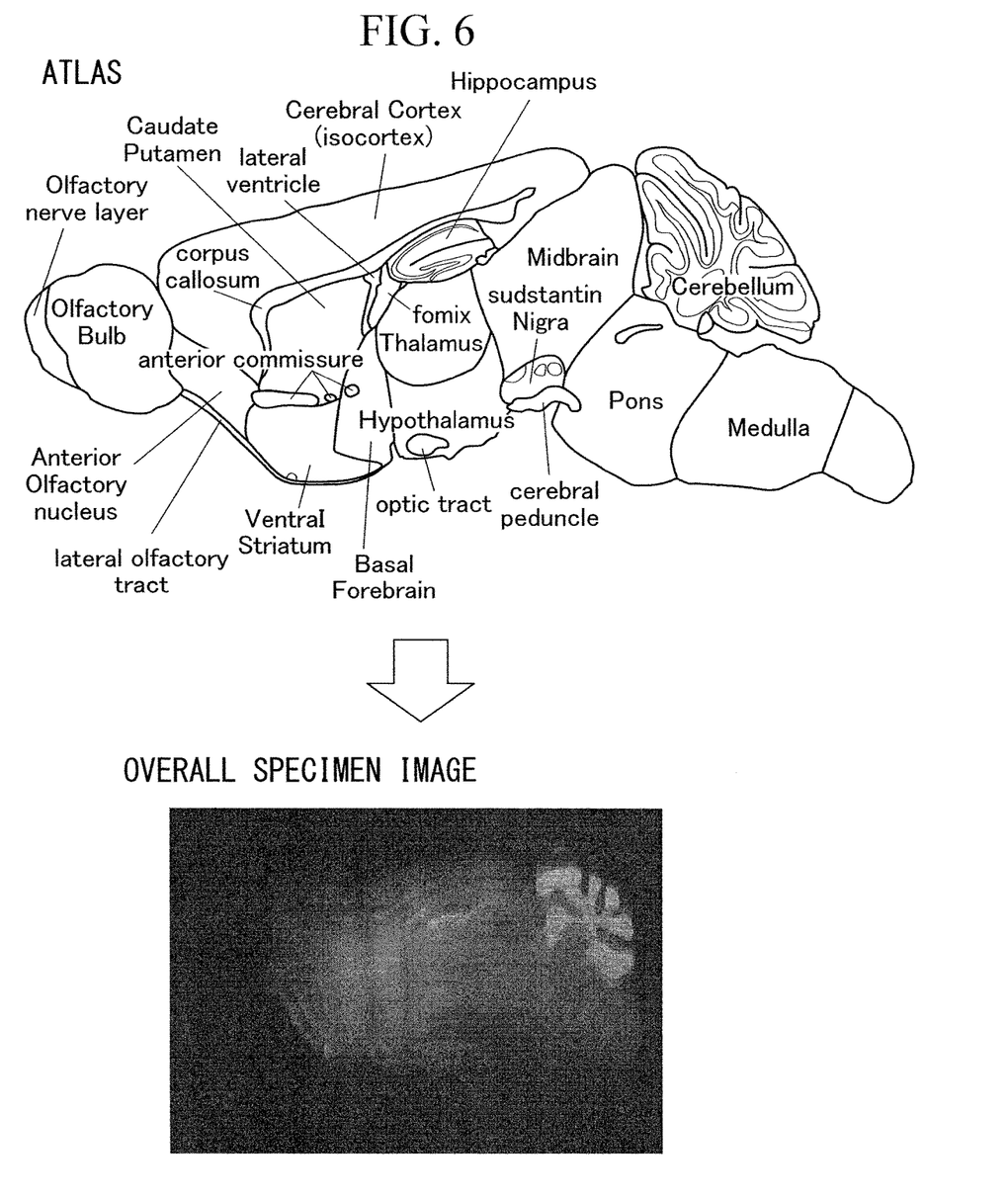
FIG. 6 is a diagram for explaining positioning between the atlas data to which conversion parameters have been applied and a map image.

In addition, the processing portion 21 is configured so as to calculate the XYZ-coordinates of the target region in the map image by applying the calculated conversion parameters to the target region in the atlas data specified by the user, thus calibrating the atlas data in the coordinate system of the map image, as shown in FIG. 6.

The high-resolution image-acquisition portion 23 is configured so as to place the high-magnification objective lens 15, which is set in advance, in the optical path of the laser beam by rotating the revolver with respect to the microscope main body 11. In addition, the high-resolution image-acquisition portion 23 is configured so as to move, with respect to the microscope main body 11, the stage 13 to the XY-coordinates of the target region, calculated by the processing portion 21. The objective lens 15 to be selected by the high-resolution image-acquisition portion 23 may be set by the user in advance.

In addition, the high-resolution image-acquisition portion 23 is configured so as to allow the microscope apparatus 1 to acquire a Z-stack image (high-resolution image) of the target region by moving, stepwise at a predetermined pitch, the stage 13 in the Z-direction with respect to the microscope main body 11 at the XY-coordinates of the target region. The high-resolution image-acquisition portion 23 is configured so as to allow the microscope apparatus 1 to acquire, in the case in which the target region is too large to fit in a single viewing field, images of a plurality of areas in XY-directions by moving the stage 13 in the X-direction and the Y-direction with respect to the microscope main body 11 at each of the Z-positions.

The operation of the thus-configured image-acquisition system 10 will be described below.

In order to observe the brain, serving as the specimen S, on the stage 13 by using the image-acquisition system 10 according to this embodiment, the user specifies desired atlas data to be used by means of the interface portion 17, and also inputs the ID of a desired target region in the specimen S. Next, the user gives an image-capturing instruction by means of the interface portion 17.

Next, the map-image-acquisition portion 19 actuates the revolver in response to the image-capturing instruction from the interface portion 17, and thus, the low-magnification objective lens 15, which is set in advance, is placed in the optical path of the laser beam. Then, by means of the map-image-acquisition portion 19, the stage 13 is moved stepwise in the Z-direction, the stage 13 is moved in the XY-directions at each of the Z-positions, and thus, images of a plurality of areas of the specimen S are acquired in the XY-directions. Then, by means of the map-image-acquisition portion 19, the images of the individual areas are combined for the same Z-position, thus generating a single stack image (map image) of the entire specimen S.

Next, by means of the processing portion 21, the registration processing is applied to the atlas data specified by the user, and the conversion parameters for positioning the atlas data in the map image are calculated. Then, by means of the processing portion 21, the calculated conversion parameters are applied to the atlas data, the atlas data are positioned in the map image, as shown in FIG. 6, and the XYZ-coordinates of the target region in the map image are calculated.

Next, by means of the high-resolution image-acquisition portion 23, the revolver is actuated and the high-magnification objective lens 15, which is set in advance, is placed in the optical path of the laser beam. Next, by means of the high-resolution image-acquisition portion 23, the stage 13 is moved to the calculated XY-coordinates of the target region, the stage 13 is moved stepwise in the Z-direction at those XY-coordinates, and the Z-stack image (high-resolution image) of the target region is acquired.

As has been described above, with the image-acquisition system 10 according to this embodiment, by acquiring the map image of the entire specimen S at a low magnification and by acquiring the image of the desired target region at a high magnification, it is possible to decrease the amount of time required to acquire an image and to decrease the volume of the image data as compared with the case in which an image of the entire specimen S is acquired at a high resolution.

In this case, even without well-developed anatomical knowledge and experience, just by having the user input the ID of the desired anatomical region in the specimen S, a high-resolution image of that target region is acquired. Therefore, it is possible to acquire a high-resolution image of a target region in the specimen S in an efficient, simple manner.

In addition, even in the case in which the position, the direction, the shape, or the like of a target region in the atlas data do not align with the position, the direction, the shape, or the like of a corresponding anatomical region in the map image of the entire specimen S, because the atlas data and the map image are associated with each other by means of the registration processing, it is possible to calculate the spatial position of the target region in a simple, precise manner.

This embodiment can be modified as described below.

Figure 7:
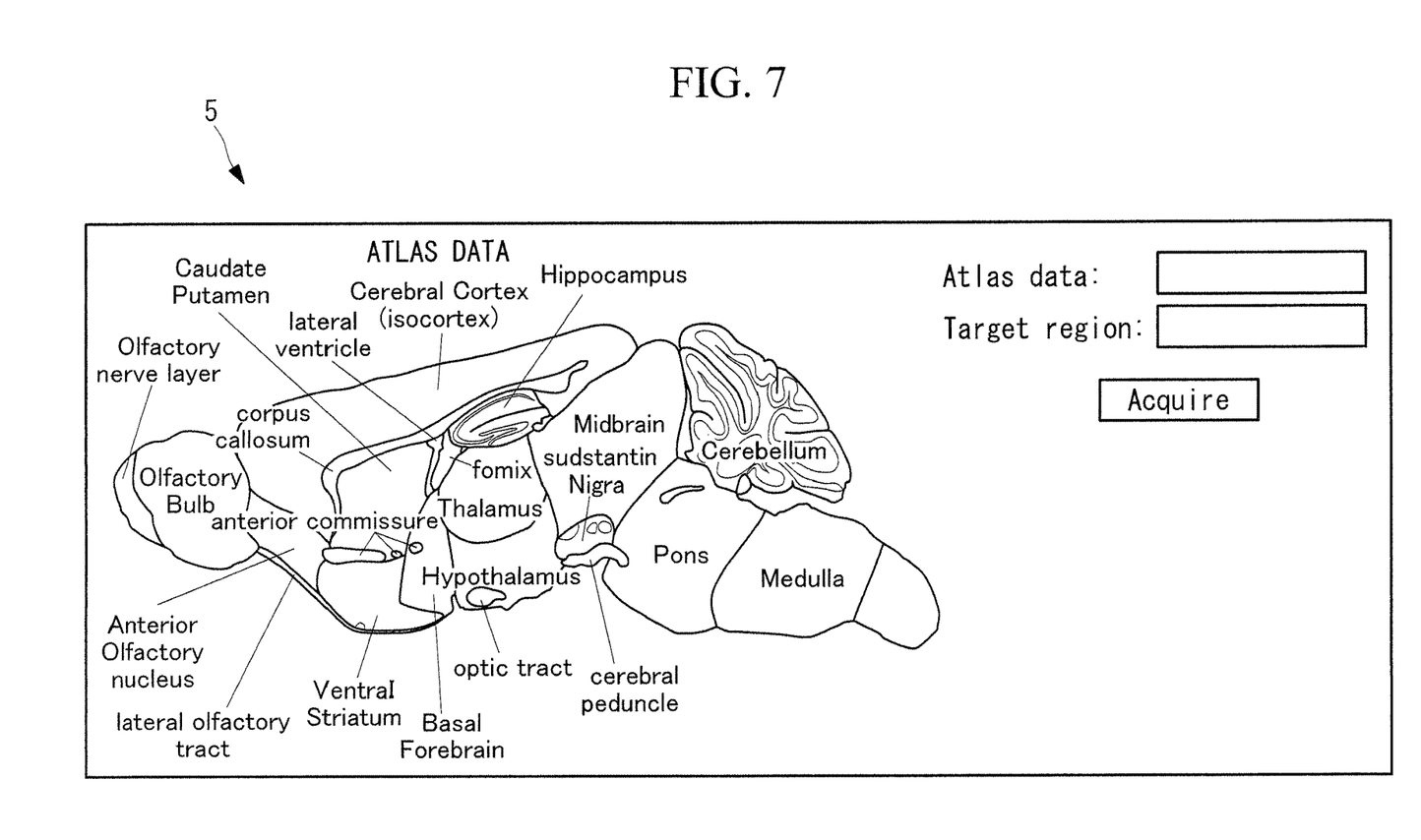
FIG. 7 is a diagram showing examples of atlas data, input fields, and an instruction button displayed on a monitor by an image-acquisition system according to a first modification of the embodiment of the present invention.

As a first modification, as shown in FIG. 7, the interface portion 17 may display, on the monitor 5, atlas data in which the ID of the target region and boundaries among the individual anatomical regions of the specimen S are indicated.

In this case, the interface portion 17 may be configured so that, when the user clicks a desired anatomical region in the atlas data on the monitor 5 by using the mouse 9, the clicked anatomical region is assumed to have been specified as the target region.

By doing so, the user can specify the target region in an intuitive, simple manner by viewing the atlas data displayed on the monitor 5.

As a second modification, the high-resolution image-acquisition portion 23 may control the microscope apparatus 1 so as to acquire a plurality of Z-stack images by shifting positions thereof stepwise in the specimen S in the Z-direction at a finer Z-step (pitch) than that used by the map-image-acquisition portion 19.

In this case, for example, the Z-step size may be set to be half of an optical resolving power that is calculated on the basis of the observation conditions used during high-resolution image acquisition.

By doing so, it is possible to observe the target region in the specimen S in detail by using a three-dimensional high-resolution image in which the resolving power is also enhanced in the Z-direction of the specimen S.

Figure 8:
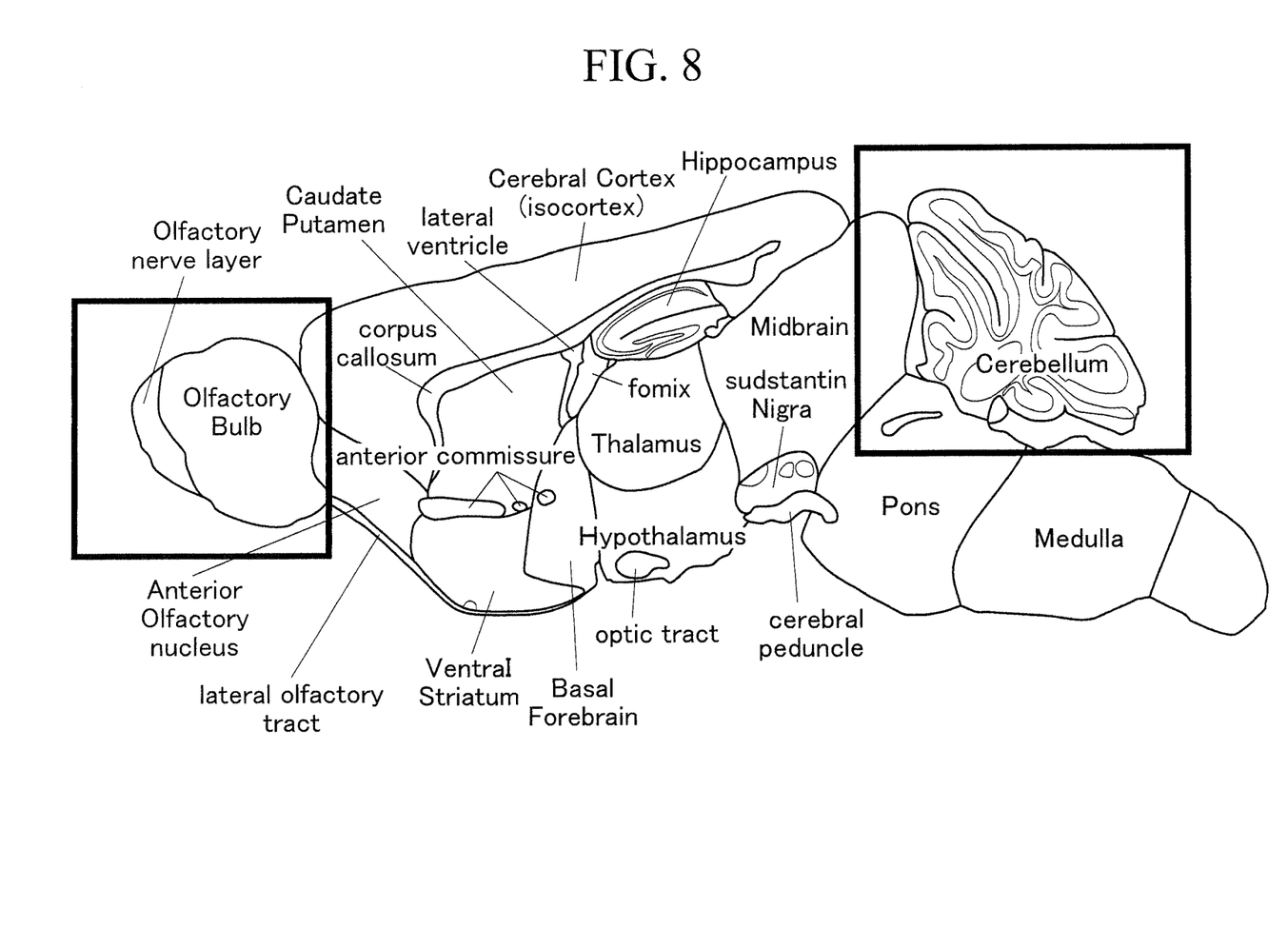
FIG. 8 is a diagram showing examples of two feature portions in a specimen processed by an image-acquisition system according to a third modification of the embodiment of the present invention.

As a third modification, the map-image-acquisition portion 19 may perform the registration processing by acquiring images of areas in certain portions of the specimen S. For example, as shown in FIG. 8, it is preferable that, by means of the map-image-acquisition portion 19, images be acquired for two or more locations having distinctive features in outline or the like in the specimen S, and that positions thereof be aligned with respect to the atlas data.

Figure 9A:
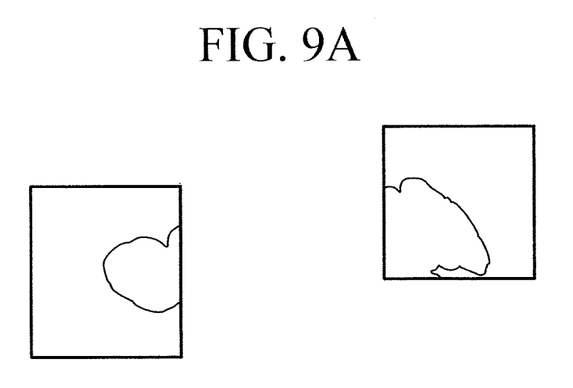
FIG. 9A is a diagram for explaining an image showing areas of certain portions of the specimen.
Figure 9B:
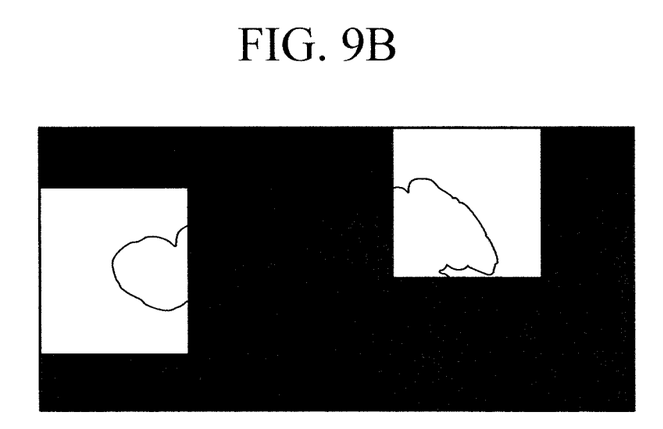
FIG. 9B is a diagram for explaining a map image of the specimen in which the luminance of a non-acquired portion is set to −1.

In this case, as shown in FIG. 9A, by means of the map-image-acquisition portion 19, the stage 13 is moved to one of the areas having the outlines in the specimen S, the user gives the image-capturing instruction by means of the interface portion 17, and an image of that area in the specimen is acquired. This operation is performed at two or more locations having distinctive features in the specimen S. Next, by means of the map-image-acquisition portion 19, as shown in FIG. 9B, marking is applied to a non-acquired portion of the specimen S with respect to the luminance thereof (for example, the luminance thereof is set to be −1), and a map image of the specimen S is generated by combining the marked image with the acquired images of the feature portions.

Figure 9C:
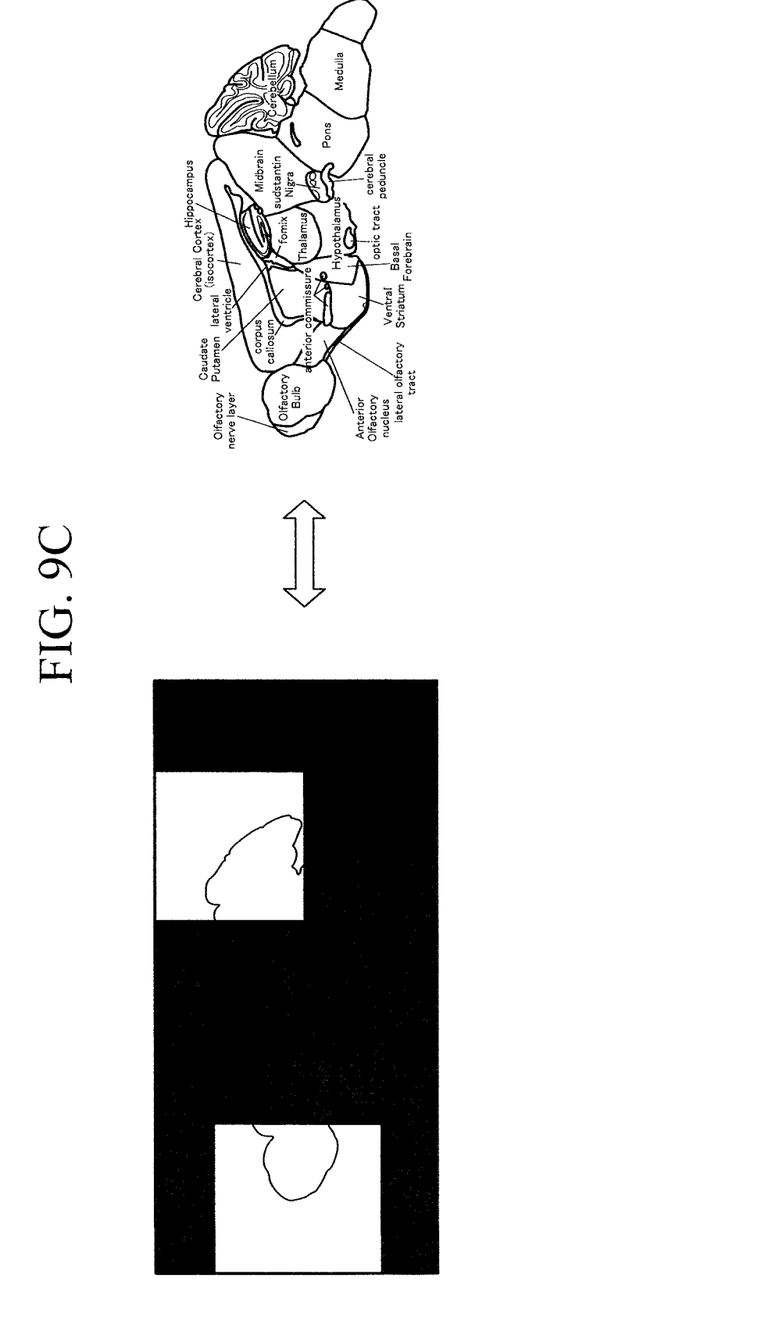
FIG. 9C is a diagram for explaining positioning between the atlas data to which conversion parameters have been applied and the certain portions in the map image.

Next, by means of the processing portion 21, as shown in FIG. 9C, the atlas data are positioned in the map image by applying the registration processing to the atlas data specified by the user, and the XYZ-coordinates of the desired target region in the map image are calculated. In the registration processing, when calculating the similarity between the atlas data and the map image, it is permissible to use only the acquired images of feature portions and to ignore the non-acquired portions in the map image. With regard to the acquisition of a high-resolution image of the target region for which the XYZ-coordinates have been calculated, descriptions thereof will be omitted because the procedures are the same as those of the above-described embodiment.

With this modification, it is possible to decrease the amount of time required to acquire an image and to decrease the volume of the image data by amounts afforded by eliminating the need to generate a map image of the entire specimen S, and thus, it is possible to enhance the work efficiency.

As has been described above, although the embodiment of the present invention has been described in detail with reference to the drawings, specific configurations thereof are not limited to this embodiment, and design alterations or the like within a range that does not depart from the scope of the present invention are also encompassed. For example, the present invention is not limited to the forms applied to the above-described embodiment and modifications; the present invention may be applied to embodiments in which these embodiment and modifications are appropriately combined, without particular limitation. In addition, in the above-described embodiment, a camera and a laser-scanning microscope apparatus may be employed as the microscope apparatus 1, a map image including a plurality of anatomical regions in the specimen S may be acquired by using the camera, and a high-resolution image of a target region in the specimen S may be acquired by using the laser-scanning microscope apparatus.

In addition, in the above-described embodiment, although anatomical regions have been described as examples of study regions in a specimen, it suffices that study regions in a specimen be regions that can be identified by means of unique identification information, and it is possible to apply the present invention to, for example, aside from the anatomical regions, regions defined from the viewpoint of genetics, cell biology, or the like, and regions defined by combining these.

From the above-described embodiment, the following inventions are derived.

An aspect of the present invention is an image-acquisition system including: an image-acquisition portion that acquires an image of a specimen; a first image-acquisition control portion that controls the image-acquisition portion so as to acquire, at a first image-capturing magnification, a first image that includes a plurality of study regions in the specimen; a target-region specifying portion that allows a user to specify a desired study region as a target region by means of unique identification information assigned to the individual study regions; a position-calculating portion that calculates a spatial position of the target region specified by the target-region specifying portion on the basis of the first image acquired by the image-acquisition portion and a reference image having positional information of the individual study regions; and a second image-acquisition control portion that controls, on the basis of the spatial position of the target region calculated by the position-calculating portion, the image-acquisition portion so as to acquire a second image of the target region in the specimen at a second image-capturing magnification which is a magnification that is greater than the first image-capturing magnification.

With this aspect, when a first image that includes a plurality of study regions in the specimen is acquired after the first image-acquisition control portion controls the image-acquisition portion, the user specifies a desired study region in the specimen as a target region by using the target-region specifying portion, and then, the position-calculating portion calculates, on the basis of the first image and the reference image having the positional information of the study regions, the spatial position of the target region specified by the user. Then, on the basis of that spatial position of the target region, the second image-acquisition control portion controls the image-acquisition portion, and thus, a second image of the target region in the specimen is acquired.

Here, by acquiring the first image at a low magnification and by acquiring the second image at a high magnification, it is possible to decrease the amount of time required to acquire an image and to decrease the volume of the image data as compared with the case in which an image of the entire specimen is acquired at a high resolution. In this case, even without well-developed anatomical knowledge and experience, just by having the user input the identification information of the desired study region, it is possible to acquire a high-resolution image of that target region. Therefore, it is possible to acquire a high-resolution image of a target region in the specimen in an efficient, simple manner.

In the above-described aspect, the position-calculating portion may perform registration processing for calculating conversion parameters for positioning the reference image with respect to the first image and calculates the spatial position of the target region on the basis of the calculated conversion parameters.

By employing such a configuration, even in the case in which the position, the direction, the shape, or the like of the target region in the reference image do not align with the position, the direction, the shape, or the like of a corresponding study region in the first image, the reference image and the first image are associated with each other by means of the registration processing, and thus, it is possible to calculate the spatial position of the target region in a simple, precise manner.

In the above-described aspect, the target-region specifying portion may display the reference image in which identification information of the target region and boundaries of the individual study regions are indicated.

By employing such a configuration, the user can intuitively specify the target region by viewing the displayed reference image.

In the above-described aspect, the first image-acquisition control portion may control the image-acquisition portion so as to acquire a plurality of the first images, the positions of which are shifted stepwise in an optical-axis direction in the specimen, and the second image-acquisition control portion may control the image-acquisition portion so as to acquire a plurality of the second images, the positions of which are shifted stepwise in the optical-axis direction in the specimen at a finer pitch than that used by the first image-acquisition control portion.

By employing such a configuration, it is possible to observe the target region in the specimen by using a three-dimensional image in which the resolving power is also enhanced in the optical-axis direction in the specimen.

In the above-described aspect, the first image-acquisition control portion may control the image-acquisition portion so as to acquire an image of the entire specimen as the first image.

By employing such a configuration, it is possible to specify a target region from all study regions in the specimen by using a single first image.

REFERENCE SIGNS LIST 1 microscope apparatus (image-acquisition portion)
10 image-acquisition system
17 interface portion (target region specifying portion)
19 map-image-acquisition portion (first image-acquisition control portion)
21 processing portion (position-calculating portion)

23 high-resolution image-acquisition portion (second image-acquisition control portion)
S specimen

The invention claimed is:

1. An image-acquisition system comprising:
an image-acquisition portion that acquires an image of a specimen;
a first image-acquisition control portion that controls the image-acquisition portion so as to acquire, at a first image-capturing magnification, a first image that includes a plurality of study regions in the specimen;
a target-region specifying portion that is operable by a user to specify a desired study region as a target region by means of unique identification information assigned to the individual study regions;
a position-calculating portion that calculates a spatial position of the target region specified by the target-region specifying portion based on the first image acquired by the image-acquisition portion and a reference image having positional information of the individual study regions; and
a second image-acquisition control portion that controls, based on the spatial position of the target region calculated by the position-calculating portion, the image-acquisition portion so as to acquire a second image of the target region in the specimen at a second image-capturing magnification which is a magnification that is greater than the first image-capturing magnification ,
wherein the first image-acquisition control portion controls the image-acquisition portion so as to acquire a plurality of the first images, positions of which are shifted stepwise in an optical-axis direction in the specimen at a first pitch, and
wherein the second image-acquisition control portion controls the image-acquisition portion so as to acquire a plurality of the second images, positions of which are shifted stepwise in the optical-axis direction in the specimen at a second pitch that is finer than the first pitch.

2. An image-acquisition system according to claim 1, wherein the position-calculating portion performs registration processing for calculating conversion parameters for positioning the reference image with respect to the plurality of first images and calculates the spatial position of the target region based on the calculated conversion parameters.

3. An image-acquisition system according to claim 1, wherein the target-region specifying portion displays the reference image in which identification information of the target region and boundaries of the individual study regions are indicated.

4. An image-acquisition system according to claim 1, wherein the first image-acquisition control portion controls the image-acquisition portion so as to acquire an image of the entire specimen as the first image.

5. An image-acquisition system according to claim 1, wherein the first image-acquisition control portion:
controls the image-acquisition portion so as to acquire images of at least two partial areas of the specimen, a total area of the at least two partial areas being smaller than a total area of the entire specimen, and
combines the acquired images of the at least two partial areas of the specimen with a marked image representing a non-acquired portion of the specimen, to thereby obtain the first image.

6. An image-acquisition system according to claim 5, wherein the position-calculating portion performs registration processing for calculating conversion parameters for positioning the reference image with respect to the plurality of first images using only the acquired images of the at least two partial areas of the specimen in each respective first image without using the marked image representing the non-acquired portion of the specimen in each respective first image, and calculates the spatial position of the target region based on the calculated conversion parameters.

7. An image-acquisition system comprising:
a microscope apparatus that acquires an image of a specimen; and
a computer that is configured to operate as:
a first image-acquisition control portion that controls the microscope apparatus so as to acquire, at a first image-capturing magnification, a first image that includes a plurality of study regions in the specimen;
a target-region specifying portion that allows a user to specify a desired study region as a target region by means of unique identification information assigned to the individual study regions;
a position-calculating portion that calculates a spatial position of the target region specified by the target-region specifying portion based on the first image acquired by the microscope apparatus and a reference image having positional information of the individual study regions; and
a second image-acquisition control portion that controls, based on the spatial position of the target region calculated by the position-calculating portion, the microscope apparatus so as to acquire a second image of the target region in the specimen at a second image-capturing magnification which is a magnification that is greater than the first image-capturing magnification,
wherein the first image-acquisition control portion controls the microscope apparatus so as to acquire a plurality of the first images, positions of which are shifted stepwise in an optical-axis direction in the specimen at a first pitch, and
wherein the second image-acquisition control portion controls the microscope apparatus so as to acquire a plurality of the second images, positions of which are shifted stepwise in the optical-axis direction in the specimen at a second pitch that is finer than the first pitch.

8. An image-acquisition system according to claim 7, wherein the position-calculating portion performs registration processing for calculating conversion parameters for positioning the reference image with respect to the plurality of first images and calculates the spatial position of the target region based on the calculated conversion parameters.

9. An image-acquisition system according to claim 7, wherein the target-region specifying portion displays the reference image in which identification information of the target region and boundaries of the individual study regions are indicated.

10. An image-acquisition system according to claim 7, wherein the first image-acquisition control portion controls the microscope apparatus so as to acquire an image of the entire specimen as the first image.

11. An image-acquisition system according to claim 7, wherein the first image-acquisition control portion:
controls the microscope apparatus so as to acquire images of at least two partial areas of the specimen, a total area of the at least two partial areas being smaller than a total area of the entire specimen, and combines the acquired images of the at least two partial areas of the specimen with a marked image representing a non-acquired portion of the specimen, to thereby obtain the first image.

12. An image-acquisition system according to claim 11, wherein the position-calculating portion performs registration processing for calculating conversion parameters for positioning the reference image with respect to the plurality of first images using only the acquired images of the at least two partial areas of the specimen in each respective first image without using the marked image representing the non-acquired portion of the specimen in each respective first image, and calculates the spatial position of the target region based on the calculated conversion parameters.

* * * * *